United States Patent Office 3,336,392
Patented Aug. 15, 1967

3,336,392
PHOSPHORUS-CONTAINING MERCAPTANS
AND PROCESS FOR MAKING SAME
Gerold Schwarzenbach, Zurich, Switzerland, assignor to
J. R. Geigy A.G., Basel, Switzerland
No Drawing. Filed July 20, 1964, Ser. No. 383,905
Claims priority, application Switzerland, July 24, 1963,
9,196/63
18 Claims. (Cl. 260—606.5)

The present invention concerns phosphorus-containing mercaptans as well as a process for the production thereof.

According to Culvenor et al., J. Chem. Society (London) 1949, p. 282, tertiary phosphines such as tri-ethyl and diphenyl phosphines react with epi-sulfide of ethylene under formation of the tri-ethyl or tri-phenyl-phosphine sulfides.

It is, therefore, very surprising that the reaction described below takes place between phosphine itself and organic phosphines containing at least one replaceable hydrogen atom, on the one hand, and ethylene epi-sulfides and its homologs on the other hand.

It has been found that mercaptans containing phosphorus are obtained by (a) reacting preferably in an inert diluent a phosphine compound of the formula $$R^1_{(3-n)}P(H)_n \qquad (I)$$

with a metal, metal hydride, metal amide or metal hydrocarbon amide, metallo-alkyl, metallo-aralkyl, with a metal donor which is a metal or metal base of the class defined hereinafter, which metal donor is capable of ionizing the phosphine compound by abstracting at least one proton bound to the phosphorus atom, contained in said phosphine, and thereby converting the latter to the corresponding metal phosphide compound, (b) reacting the latter, preferably in an inert diluent with a compound of the formula

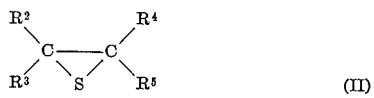

(II)

to form the corresponding metal mercaptide compound and reacting the latter with a proton acid, thereby converting the mercaptide compound to the free mercapto compound of the formula

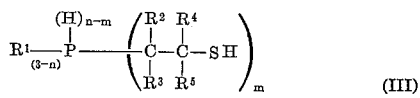

(III)

In the above formulas:

$R^1$ represents an unsubstituted alkyl, cycloalkyl, aralkyl or aryl group or such a group containing inert substituents, and more particularly, $R^1$ represents in a preferred class of compounds falling under Formula III, hydrogen, alkyl of from 1 to 18 carbon atoms, cyclohexyl, unsubstituted phenyl alkyl of from 7 to 8 carbon atoms, halogeno-substituted, especially chloro- or bromo-substituted, lower alkyl-substituted or lower alkoxy-substituted phenyl alkyl wherein the phenyl-alkyl moiety has from 7 to 8 carbon atoms, phenyl, chlorophenyl, lower alkyl-phenyl, lower alkoxyphenyl, hydroxy-lower alkyl or lower alkoxy-lower alkyl; each of $R^2$, $R^3$, $R^4$ and $R^5$ independently of the others represents hydrogen or an unsubstituted alkyl, cycloalkyl or aralkyl group or such a group containing inert substituents, and $R^2$ and $R^4$ together also represent a 1,3-trimethylene or 1,4-tetramethylene group, and in the above mentioned preferred class of components, each of $R^2$, $R^3$, $R^4$ and $R^5$ represents hydrogen or lower alkyl, at least one of the latter four R's being hydrogen;

$n$ represents a positive whole number from 1 to 3 and $m$ represents a positive whole number of at most $n$.

When $R^1$, $R^2$, $R^3$, $R^4$ and $R^5$ are unsubstituted alkyl groups, then they are in particular straight chained alkyl groups having advantageously 1 to 8 carbon atoms, e.g. the methyl, ethyl, n-propyl or n-octyl group. If they are a cycloalkyl group then they contain 5 to 8 carbon atoms and represent, mainly, the cyclohexyl group; if they are an aralkyl group they contain 7 to 9 carbon atoms and represent in particular the benzyl group.

When $R^1$ is an aryl group then it is in particular one of the benzene series, preferably the phenyl radical.

As defined, these groups can contain inert substituents. Such substituents of the alkyl group are, e.g.: the hydroxyl group, also ether groups such as alkoxy, cycloalkoxy, aralkoxy or aryloxy groups, thioether groups such as alkylthio, cycloalkylthio, aralkylthio or arylthio groups, whereby preferably alkoxy and alkylthio groups have 1 to 4 carbon atoms, cycloalkoxy and cycloalkylthio groups have 5 to 8 carbon atoms and aralkoxy and aralkylthio groups have 7 to 9 carbon atoms and arylthio groups are, in particular, of the benzene series. In addition, substituents of the alkyl groups are tert. amino or tert. phosphino groups, chiefly dialkylamino or dialkylphosphino groups (preferably having 1 to 4 carbon atoms per alkyl radical). In the aralkyl and aryl groups, the rings can contain the usual inert substituents which do not dissociate acid in water, e.g. alkyl or alkoxy groups having, in particular 1 to 4 carbon atoms, and also halogens such as chlorine or bromine.

Recurring radicals $R^1$ or

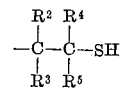

in Formula III can be identical or different.

Examples of starting materials of Formula I are, e.g.: phosphine, monoalkyl phosphines such as methyl-, ethyl-, n-propyl-, isopropyl-, n-butyl- or n-octyl-phosphine, monocycloalkylphosphine such as cyclohexylphosphine, monoaralkylphosphines, e.g. benzyl phosphine, or monoarylphosphines such as phenyl phosphine, chlorophenyl- or methoxyphenyl-phosphine, also dialkylphosphines such as dimethyl-, diethyl- or methylethyl-phosphine, P-alkyl-P-aryl phosphines such as P-methyl-P-phenyl-phosphine, also dicycloalkyl-phosphines such as dicyclohexyl-phosphine, diaralkyl-phophines, e.g. dibenzylphosphine, P-cycloalkyl-P-aryl-phosphines, e.g. P-cyclohexyl-P-phenyl-phosphine, P-aralkyl-P-aryl-phosphines such as P-benzyl-P-phenyl-phosphine or diarylphosphines, e.g. diphenylphosphine or di-(methoxy-phenyl)-phosphines. Because of their easy accessibility, phosphine, low monoalkyl and dialkyl phosphines, and monophenyl and diphenyl phosphine are preferred.

Starting materials of Formula II are, for example, the sulfides of 1,2-ethylene, 1,2-propylene, 2,3-butylene, 1,2-isobutylene or 1,2-cyclohexylene. Because of their easy accessibility, those compounds of Formula II and the corresponding subclass of compounds falling under Formula III are preferred in which at least two of $R^2$, $R^3$, $R^4$ and $R^5$ are hydrogen.

As has been mentioned hereinbefore, the replacement of $m$ hydrogen atoms bound to the phosphorus atom in the phosphine compound of Formula I by the equivalent amount of a metal is performed in a first mode of operation by reacting a metal with this phosphine compound. Metals which form relatively easily soluble phosphides are suitable, in particular those of the first main group of the periodic system such as lithium, sodium, potassium, rubidium or cesium, also, however, those of the second main group of this system such as magnesium or calcium.

In a second mode of operation, depending on the diluent used and sufficient solubility of the reactants therein, instead of the metals mentioned above, strong Bronstead- Lewis-type base compounds of these metals are used, such base compounds being their hydrides, e.g. lithium, sodium or calcium hydride, or amides such as sodium, potassium or sodium-methyl amide, or metallo-organic compounds such as phenyl lithium or triphenylmethyl sodium or Grignard compounds.

In phosphines of Formula I in which $R^1$ is a phenyl radical substituted by halogen, the replacement of the hydrogen bound by way of phosphorus is preferably performed by means of a metal amide, in particular by means of one of the metal amides mentioned above.

The metals or metal compounds mentioned above can be reacted with the phosphine of Formula I, e.g. in an inert organic diluent such as in an ether, for example in diethyl ether, dioxan or tetrahydrofuran, preferably however in liquid ammonia or in methylamine or N-methyl aniline.

The reaction of the metal phosphide with the compounds of Formula II is preferably performed in one of the diluents mentioned above, advantageously in liquid ammonia. As the metal phosphides are generally colored, the end of the reaction can usually be recognized by disappearance of the coloring. The metal mercaptide of the compounds corresponding to Formula III is first formed. The conversion of this metal mercapto compound to the free mercaptan of Formula III is performed in every case by the addition of a proton acid, preferably in the form of weakly acid substances, for example, ammonium salts of strong mineral acids such as ammonium chloride or ammonium sulfate.

When in a phosphine compound of Formula I wherein $n=2$ or 3, more than one hydrogen atom bound by way of phosphorus is to be replaced, in the process according to the invention, by the group

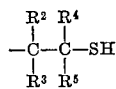

then the reaction described is advantageously performed in stages; namely, first the hydrogen atom bound by phosphorus is replaced by metal, the metal phosphide compound obtained is reacted with the compound of Formula II to form the corresponding metal mercaptide and then this reaction sequence, optionally after isolation of the free mercapto compound, is repeated corresponding to the number of the phosphorus-bound hydrogen atoms remaining.

The new phosphorus-containing mercaptans of Formula III are amphoteric, partly liquid, partly solid substances. Because, in general, they have great sensitivity to oxidation, they are stored advantageously under conditions which exclude oxygen. They form stable complexes with most heavy metal ions, for example with copper, silver, gold, iron, nickel, cobalt, zinc, cadmium, mercury, lead, tin, bismuth and the platinum metals, and are, therefore, useful for the qualitative and quantitive determination of such heavy metal ions, for the separation of these metals from each other and also for the separation thereof from other metals.

Moreover, they are suitable for the extraction of such metals, e.g. cadmium, for instance from an aqueous solution of the latter, with the acid of an organic phase such as benzene or chloroform in which latter organic solvents the heavy metal complexes formed of the compounds of Formula III are easily soluble.

*Example 1*

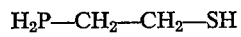

8.5 g. (0.37 gram atoms) of sodium metal are dissolved in 500 ml. of dry liquid ammonia while cooling with Dry Ice to a temperature below the boiling point of ammonia, and the hydrogen phosphide developed from 67 g. (0.41 gram mols) of phosphonium iodide is introduced into this solution during two hours, the introduction being made with nitrogen as carrier gas. Afterwards, nitrogen is passed through the solution for 20 minutes and then 22 g. (0.365 gram mols) of ethylene sulfide in 25 ml. of diethyl ether are added dropwise within 20 minutes. The ammonia is then evaporated off and the residue is dissolved at room temperature (about 20° C.) in 250 ml. of diethyl ether and 250 ml. of a concentrated aqueous ammonium chloride solution. The ethereal phase is separated and dried with a synthetic zeolite (Linde molecular sieve) prepared as a drying agent, the solvent is evaporated and the residue is distilled, all these steps being performed under an atmosphere of nitrogen.

In this way, the β-mercapto-ethyl phosphine of the above formula is obtained. It is a liquid having an unpleasant smell which boils at 131–133° under 731 torr and is only slightly soluble in water. Refractive index: $n_D^{20}=1.5442$. With heavy metal ions, the phosphine forms insoluble precipitates.

By using, instead of ethylene sulfide, an equivalent amount of 2,3-butylene sulfide and otherwise following the procedure described above, 1-methyl-2-mercaptopropyl phosphine is obtained.

Similar results are obtained when using equivalent amounts of metallic potassium, lithium, calcium or magnesium in lieu of sodium in the above example.

*Example 2*

HP (CH$_2$—CH$_2$—SH)$_2$ 17.25 g. (0.75 gram atoms) of sodium are dissolved in 600 ml. dry liquid ammonia with the addition of a pinch of iron-(III)nitrate as catalyst. The solution is kept at the boiling temperature of the ammonia until its initial blue color disappears. This solution is then cooled to −78° and 35.5 g. (0.378 gram mols) of β-mercaptoethyl phosphine (produced according to Example 1) are slowly added dropwise. 22 g. (0.366 gram mols) of ethylene sulfide dissolved in 22 g. of diethyl ether are added dropwise to the solution obtained. The ammonia is then evaporated off in a stream of nitrogen and the residue is worked up as described in Example 1 except that the end product must be distilled in vacuo.

Bis-(β-mercapto-ethyl)-phosphine is obtained in this way. It is a liquid which has a very unpleasant smell and is almost insoluble in water. It boils at 126° under 10 torr. Refractive index $n_D^{20}=1.5938$. This compound forms difficultly soluble precipitates with heavy metal ions.

*Example 3*

P (CH$_2$—CH$_2$—SH)$_3$ 17.7 g. (0.77 gram atoms) of sodium are dissolved in 650 ml. of dry liquid ammonia with the addition of a pinch of iron-(III)nitrate. Hydrogen is developed and when this is completed, 38.5 g. (0.25 gram mols) of bis-(β-mercaptoethyl)-phosphine (produced according to Example 2) are added dropwise at −78°. 14.8 g. (0.246 gram mols) of ethylene sulfide in 20 ml. of diethyl ether are slowly added dropwise to this mixture and then the ammonia is evaporated off in a stream of nitrogen. The residue is worked up as described in Example 1 with the exception that the end product must be distilled under high vacuum. In this way tris-(β-mercaptoethyl)-phosphine is obtained. This is an oil having an unpleasant smell. It is only very slightly soluble in water and it boils at 143° under a pressure of $5.10^{-3}$ torr. Refractive index $n_D^{20}=1.6169$. This compound forms crystalline 1:1 and 1:2 complexes with nickel, palladium, platinum and cobalt ions.

The same compound is obtained by converting hydrogen phosphide into the trisodium phosphide and reacting the latter with 3 mols of ethylene sulfide.

*Example 4*

C$_2$H$_5$(H)P—CH$_2$—CH$_2$—SH 14 g. (0.61 gram atoms) of sodium are dissolved in 500 ml. of dry liquid ammonia while cooling with Dry Ice and 0.5 g. of iron-(III)nitrate are added. After the blue color disappears, 0.54 gram mols of monoethyl phosphine dissolved in 30 ml. of diethyl ether are added to this solution. The ammonia is then evaporated off in a stream of nitrogen and the residue is worked up as described in Example 1 with the exception that the end product is distilled under 10 torr.

β-Mercaptoethyl-ethyl phosphine of the above formula is obtained in this way. This compound is a very unpleasantly smelling oil which is difficultly soluble in water. It boils at 52–53° under 10 torr. Refractive index $n_D^{20}=$ 1.5289. The phosphine forms difficultly soluble precipitates with heavy metal ions.

By using, instead of the ethyl phosphine, an equivalent amount of methyl-, octyl-, octadecyl-, cyclohexyl-, benzyl- or β-phenylethyl-phosphine and otherwise the same procedure as described above is followed, then instead of β - mercaptoethyl - ethyl phosphine, β-meracptoethyl-methyl-phosphine, β-mercaptoethyl-octyl-phosphine, β-mercaptoethyl - octadecyl-phosphine, β-mercaptoethyl-cyclohexyl-phosphine, β-mercaptoethyl-benzyl-phosphine or β - mercaptoethyl - β'-phenylethyl-phosphine is obtained. The octadecyl - phosphine is obtained from octadecylbromide and potassiumamide in liquid ammonia working according to the procedure of G. W. Watt and R. C. Thompson, Jr., J. A. C. S. 70, 2295 (1948). When instead of the ethyl-phosphine in the above procedure 0.27 gram mols of β-hydroxyethyl-phosphine is used, β-mercaptoethyl-β-hydroxyethyl-phosphine is obtained.

Example 5

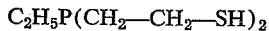
$C_2H_5P(CH_2\text{—}CH_2\text{—}SH)_2$ 7.7 g. (0.335 gram atoms) of sodium are dissolved in 400 ml. of dry liquified ammonia and 20.3 (0.166 gram mols) of β-mercaptoethyl-ethyl phosphine (produced according to Example 4) are added dropwise to this solution whereupon the solution becomes dark red colored. The reaction mixture is kept for half an hour at the boiling temperature of the ammonia and then 9.0 g. (0.15 gram mols) of ethylene sulfide in 20 ml. of diethyl ether are added. The last drops cause a change in color from red to grey. The ammonia is then evaporated off under a nitrogen atmosphere and the residue is worked up as described in Example 1 with the exception that the end product is distilled under high vacuum.

In this way, bis-(β-mercaptoethyl) P-ethyl phosphine is obtained. It is a very unpleasant smelling oil which boils at 90–91° under 0.01 torr. Refractive index $n_D^{20}=1.5717$. This compound forms crystalline 1:1 and 1:2 complexes with nickel, palladium and platinum ions.

Example 6

$(C_2H_5)_2P\text{—}CH_2\text{—}CH_2\text{—}SH$ 7.0 g. (0.305 gram atoms) of sodium are dissolved in 400 ml. of dry liquid ammonia and 24 g. (0.265 gram mols) of diethyl phosphine are slowly added dropwise to this solution at —78°. The temperature is then raised to the boiling point of the solvent and 16.15 g. (0.27 gram mols) of ethylene sulfide in 50 ml. of diethyl ether are added dropwise to the reaction mixture. After completion of this addition, the ammonia is evaporated off under an atmosphere of nitrogen and the residue is worked up as described in Example 1 with the exception that the end product must be distilled under high vacuum. In this way, β-mercaptoethyldiethyl phosphine is obtained. This is a very unpleasant smelling oil which boils at 43–44° under 0.001 torr. Refractive index $n_D^{20}=1.5202$. It forms crystalline 1:2 complexes with nickel, palladium and platinum ions.

By using, instead of ethylene sulfide, an equivalent amount of cyclohexene sulfide or 1,2-isobutylene sulfide, and otherwise following the procedure described above, 2-mercapto-cyclohexyl-diethyl phosphine or a mixture of β-mercapto-β,β-dimethylethyl- and β-mercapto - α,α - dimethyl-ethyl phosphine, respectively, are obtained instead of β-mercaptoethyl-diethyl phosphine.

Example 7

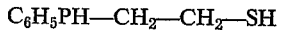
$C_6H_5PH\text{—}CH_2\text{—}CH_2\text{—}SH$ 9.2 g. (0.144 gram mols) of butyl lithium in 150 ml. of diethyl ether are added to a solution of 16 g. (0.145 gram mols) of monoethyl phosphine in 300 ml. of diethyl ether. A lithium phenyl phosphide solution is formed and 9.0 g. (0.15 gram mols) of ethylene sulfide in 150 ml. of diethyl ether are added slowly dropwise thereto at 15–20°. Then 150 ml. of methanol and 150 ml. of a saturated aqueous ammonium chloride solution are added to the reaction solution. The ether phase formed is separated, dried with magnesium sulfate, the ether is evaporated off and the residue is distilled under high vacuum.

There is thus obtained β-mercaptoethyl P-phenyl phosphine which boils at 80–82° under 0.01 torr. Refractive index $n_D^{20}=1.6109$. It forms difficulty soluble precipitates with heavy metal ions.

By using, instead of phenyl phosphine, an equivalent amount of p-toluene phosphine, p-methoxyphenyl phosphine, p-chloro-phenyl phosphine or P-ethylphenyl phosphine and otherwise following the procedure described above, β-mercaptoethyl P-p-toluyl phosphine, β-mercaptoethyl-(p-methoxy-phenyl)-phosphine, β-mercaptoethyl p-chlorophenyl phosphine and β-mercaptoethyl p-ethylphenyl phosphine, respectively, are obtained instead of β-mercaptoethyl-phenyl phosphine.

p-Methoxy-phenyl phosphine is obtained from p-methoxy-phenyl-dichloro-phosphine by reduction with lithium aluminum-hydride analogously to J. Horvat and A. Furst, J.A.C.S., 74, 562 (1952).

Example 8

$(C_6H_5)_2P\text{—}CH_2\text{—}CH_2\text{—}SH$ 200 ml. of a 1-molar solution of phenyl lithium are added dropwise to a solution of 37.2 g. (0.20 gram mols) of diphenyl phosphine in 100 ml. of diethyl ether. 12 g. (0.20 gram mols) of ethylene sulphide dissolved in 100 ml. of diethyl ether are slowly added dropwise to this solution. On completion of the exothermic reaction, the solution is stirred for 3 hours at room temperature and then 100 ml. of methanol and 50 ml. of a saturated aqueous ammonium chloride solution are added. After shaking this mixture, the ethereal phase is isolated, dried with magnesium sulfate, the solvent is evaporated off and the residue is distilled under high vacuum.

In this way, β-mercaptoethyl-diphenyl phosphine is obtained. This compound is an oil which is practically insoluble in water and it boils at 152–153° under a pressure of 0.05 torr. Refractive index $n_D^{20}=1.6411$. It forms crystalline 1:2 complexes with nickel, palladium and platinum ions.

By using an equivalent amount of dicyclohexyl-, butyl-phenyl-, bis-p-dichlorophenyl-, p-methylbenzyl-phenyl-, p-methoxy-benzyl-phenyl, o-chlorobenzyl-phenyl-phosphine or bis-β-butoxy-ethyl-phosphine instead of diphenyl-phosphine; β-mercaptoethyl-dicyclohexyl-phosphine, β-mercaptoethyl-butyl-phenyl-phosphine, β-mercaptoethyl - bis - p-dichloro-phenyl-phosphine, β-mercaptoethyl - p - methylbenzyl - phenyl - phosphine, β-mercaptoethyl-p-methoxybenzyl - phenyl - phosphine, β - mercaptoethyl-o-chlorobenzyl-phenyl-phosphine or β-mercaptoethyl-bis-β-butoxyethyl-phosphine, respectively, are obtained instead of β-mercapto-ethyl-diphenyl-phosphine.

The starting reactants, p - methylbenzyl - phenyl-, p-methoxybenzyl-phenyl- and o-chlorobenzylphenyl-phosphine are obtained by the method of E. Pass et al., Monatshefte für Chemie 90, 792 (1959) by reacting the sodium salt of phenyl-phosphine with p-methylbenzyl-chloride, p-methoxybenzyl chloride and o-chloro-benzyl-chloride, respectively.

Example 9

$C_6H_5P(CH_2-CH_2-SH)_2$ 6.2 g. (0.269 gram atoms) of sodium are added to the solution of 30 g. (0.272 gram mols) of phenyl phosphine in 250 ml. of dry liquid ammonia. 16.5 g. (0.275 gram mols) of ethylene sulfide in 100 ml. of diethyl ether are added dropwise to the solution formed, the addition being made within 30 minutes at −60°, whereupon the whole is stirred for 2 hours in a cooling bath of Dry Ice and acetone. Another 6.2 g. (0.269 gram atoms) of sodium are then added to the reaction solution and then, at −50°, 16.5 g. (0.275 gram mols) of ethylene sulfide in 100 ml. of diethyl ether are added dropwise. The solvents are then evaporated off and the residue is extracted with a mixture of 150 ml. of methanol, 100 ml. of diethyl ether and 150 ml. of a saturated aqueous ammonium chloride solution. The reaction product is further worked up analogously to Example 8, whereby bis-(β-mercapto-ethyl)-phenyl phosphine is obtained as an oil which boils at 164–166° under 0.35 torr. Refractive index $n_D^{20} = 1.6211$ This compound forms crystalline 1:1 and 1:2 complexes with nickel, palladium and platinum ions.

I claim:

1. A process for the process for the production of phosphorous-containing mercaptans, comprising
   (a) reacting in an inert diluent a phosphine compound of the formula $$R^1_{(3-n)}-P(H)_n \quad (I)$$

wherein

R¹ is a member selected from the group consisting of an alkyl, cycloalkyl, aralkyl and aryl group, and n is an integer ranging from 1 to 3,
   with at least m equivalents of a metal donor capable of ionizing the said phosphine compound by abstracting m protons bound to the phosphorus atom contained in said phosphine therefrom, thereby converting said phosphine compound to the corresponding metal phosphide compound, m being a positive integer not greater than n;
   (b) reacting the latter in an inert diluent with a compound of the formula

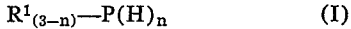

wherein each of R², R³, R⁴ and R⁵ represents a member selected from the group consisting of hydrogen, alkyl, cycloalkyl and aralkyl, and R² and R⁴ taken together also represent a member selected from the group consisting of 1,3-trimethylene and 1,4-tetramethylene,
   thereby forming the corresponding metal mercaptide compound,
   (c) reacting the latter with a proton acid, thereby converting it to the free mercapto compound of the formula

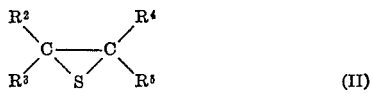

wherein

R¹, R², R³, R⁴, R⁵, m and n have the meanings given above; and
   (d) recovering the latter compound from the reaction mixture, the entire process being carried out in an atmosphere substantially free from oxygen.

2. A process as defined in claim 1, wherein said metal donor is a metal selected from the group consisting of an alkali metal and an alkaline earth metal.

3. A process as defined in claim 1, wherein said metal donor is a metal base compound selected from the group consisting of a Grignard hydrocarbon, a metal hydride, a metal amide, a metallo-alkyl compound, a metallo-aryl compound, the metal moiety of the last four members being a member selected from the group consisting of an alkali metal and an alkaline earth metal.

4. A process as defined in claim 1, wherein the metal donor is sodium.

5. A process as defined in claim 1, wherein the inert diluent is a member selected from the group consisting of diethyl ether, dioxan, tetrahydrofuran, liquid ammonia, methylamine and N-methyl anilide.

6. A process as defined in claim 1, wherein the inert diluent is liquid ammonia.

7. A process as defined in claim 1, wherein the proton acid is added in step (c) in the form of an ammonium salt of a strong mineral acid.

8. A process as defined in claim 1, wherein the proton acid is added in step (c) in the form of ammonium chloride.

9. A process as defined in claim 1, wherein the proton acid is added in step (c) in the form of ammonium sulfate.

10. A mercapto compound the metal-free form of which is of the formula

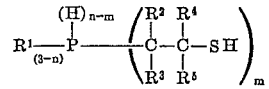

wherein R¹ represents a member selected from the group consisting of hydrogen, alkyl of from 1 to 18 carbon atoms, cyclohexyl, unsubstituted phenyl-alkyl of from 7 to 8 carbon atoms, halogeno-substituted, especially chloro- and bromo-substituted, lower alkyl-substituted and lower alkoxy-substituted phenyl alkyl wherein the phenyl-alkyl moiety has from 7 to 8 carbon atoms, phenyl, chlorophenyl, lower alkyl-phenyl, lower alkoxy-phenyl, hydroxy, lower alkyl and lower alkoxy-lower alkyl;

each of R², R³, R⁴ and R⁵ represents a member selected from the group consisting of hydrogen and lower alkyl, at least one of the latter four R's being hydrogen;

n is an integer ranging from 1 to 3; and m is a positive integer at most equal to n.

11. β-Mercapto-ethyl phosphine.
12. Bis-(β-mercapto-ethyl) phosphine.
13. Bis-(β-mercapto-ethyl) P-ethyl-phosphine.
14. β-Mercapto-ethyl P,P-diethyl-phosphine.
15. β-Mercapto-ethyl P-phenyl phosphine.
16. β-Mercapto-ethyl P-p-toluyl-phosphine.
17. β-Mercapto-ethyl P,P-di-phenyl-phosphine.
18. Bis-(β-mercapto-ethyl) P-phenyl-phosphine.

References Cited

UNITED STATES PATENTS 2,957,931  10/1960  Hamilton et al. ___ 260—606.5 X
3,267,149  8/1966  Garner _____ 260—606.5

TOBIAS E. LEVOW, *Primary Examiner.*

W. F. BELLAMY, *Assistant Examiner.*